ized States Patent (12) Ren et al.

(10) Patent No.: US 10,891,941 B2
(45) Date of Patent: Jan. 12, 2021

(54) METHOD FOR PRESENTING VIRTUAL RESOURCE, CLIENT, AND PLUG-IN

(71) Applicant: TENCENT TECHNOLOGY (SHENZHEN) COMPANY LIMITED, Shenzhen (CN)

(72) Inventors: Chunjian Ren, Shenzhen (CN); Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 148 days.

(21) Appl. No.: 16/204,213

(22) Filed: Nov. 29, 2018

(65) Prior Publication Data
US 2019/0096393 A1  Mar. 28, 2019

Related U.S. Application Data

(63) Continuation of application No. PCT/CN2017/096766, filed on Aug. 10, 2017.

(30) Foreign Application Priority Data

Sep. 22, 2016  (CN) .......................... 2016 1 0843710

(51) Int. Cl.
*G06F 40/55* (2020.01)
*G10L 15/08* (2006.01)
(Continued)

(52) U.S. Cl.
CPC .............. *G10L 15/08* (2013.01); *G06F 40/55* (2020.01); *G06K 9/6201* (2013.01); *G06N 7/02* (2013.01);
(Continued)

(58) Field of Classification Search
CPC .... G06F 40/211; G06F 40/253; G06F 40/268; G06F 40/284; G06F 40/30; G10L 15/00; G10L 15/26
See application file for complete search history.

(56) References Cited

U.S. PATENT DOCUMENTS 5,907,793 A * 5/1999 Reams ................... H04H 20/38
  348/E7.069
8,606,577 B1 * 12/2013 Stewart ................... G06F 3/167
  704/231
(Continued)

FOREIGN PATENT DOCUMENTS

CN     2930140 Y     8/2007
CN    103092985 A    5/2013
(Continued)

OTHER PUBLICATIONS

The World Intellectual Property Organization (WIPO) International Search Report for PCT/CN2017/096766 dated Oct. 26, 2017 6 Pages (including translation).
(Continued)

*Primary Examiner* — Lamont M Spooner
(74) *Attorney, Agent, or Firm* — Anova Law Group, PLLC

(57) ABSTRACT

The present application discloses a method for presenting a virtual resource, a client, and a plug-in. The method includes: receiving a virtual resource associated with a piece of push information, and first text information associated with the push information from a server; presenting the first text information and prompt information, the prompt information prompting a user to input an audio data input to obtain the virtual resource; receiving audio data input by the user, obtaining an audio file data packet; uploading the audio data packet to the server for audio recognition; receiving second text information returned by the server, and deter-
(Continued)

mining an interaction result according to the first text information and the second text information; and presenting the virtual resource and sending a virtual resource activation acknowledgment message to the server based on the interaction result.

20 Claims, 14 Drawing Sheets

(51) Int. Cl.

| | |
|---|---|
| *G06K 9/62* | (2006.01) |
| *G10L 15/28* | (2013.01) |
| *G06N 7/02* | (2006.01) |
| *H04L 29/08* | (2006.01) |
| *G06Q 30/02* | (2012.01) |
| *H04L 29/06* | (2006.01) |
| *G06Q 20/12* | (2012.01) |
| *G06Q 20/34* | (2012.01) |
| *G06Q 20/38* | (2012.01) |
| *G10L 15/30* | (2013.01) |
| *G06Q 20/32* | (2012.01) |
| *G06Q 20/40* | (2012.01) |
| *G06Q 20/06* | (2012.01) |

(52) U.S. Cl.
CPC ......... *G06Q 20/06* (2013.01); *G06Q 20/123* (2013.01); *G06Q 20/3272* (2013.01); *G06Q 20/351* (2013.01); *G06Q 20/387* (2013.01); *G06Q 20/40145* (2013.01); *G06Q 30/0214* (2013.01); *G10L 15/285* (2013.01); *G10L 15/30* (2013.01); *H04L 65/607* (2013.01); *H04L 67/06* (2013.01); *H04L 67/26* (2013.01)

(56) References Cited

U.S. PATENT DOCUMENTS

| | | | | |
|---|---|---|---|---|
| 9,208,225 | B1* | 12/2015 | Sharifi | G06Q 50/01 |
| 10,134,051 | B1* | 11/2018 | Mueller | G06Q 30/0207 |
| 10,438,214 | B1* | 10/2019 | Kim | G06Q 30/02 |
| 2005/0022253 | A1* | 1/2005 | Chen | H04N 21/23424 |
| | | | | 725/135 |
| 2005/0259959 | A1* | 11/2005 | Nagao | G11B 27/11 |
| | | | | 386/230 |
| 2007/0268164 | A1* | 11/2007 | Lai | H04N 21/2405 |
| | | | | 341/51 |
| 2008/0255837 | A1* | 10/2008 | Kahn | G10L 25/48 |
| | | | | 704/235 |
| 2009/0055005 | A1* | 2/2009 | Oxman | G10L 19/16 |
| | | | | 700/94 |
| 2010/0211446 | A1* | 8/2010 | Ray | G06Q 30/0269 |
| | | | | 705/14.19 |
| 2011/0016111 | A1* | 1/2011 | Xie | G06F 16/3346 |
| | | | | 707/723 |
| 2011/0288917 | A1* | 11/2011 | Wanek | G06Q 30/0252 |
| | | | | 705/14.5 |
| 2012/0033825 | A1* | 2/2012 | Zinn, II | H04H 60/51 |
| | | | | 381/77 |
| 2012/0323576 | A1* | 12/2012 | Wang | G16H 15/00 |
| | | | | 704/251 |
| 2013/0006738 | A1* | 1/2013 | Horvitz | G06Q 30/0207 |
| | | | | 705/14.16 |
| 2013/0151239 | A1* | 6/2013 | Kobayashi | G06F 40/247 |
| | | | | 704/9 |
| 2013/0275130 | A1* | 10/2013 | Nada | G10L 15/22 |
| | | | | 704/235 |
| 2013/0311467 | A1* | 11/2013 | Galle | G06F 40/247 |
| | | | | 707/737 |
| 2013/0325884 | A1* | 12/2013 | Soel | G06F 40/194 |
| | | | | 707/758 |
| 2014/0170929 | A1* | 6/2014 | Lipman | G09B 5/062 |
| | | | | 446/175 |
| 2014/0365216 | A1* | 12/2014 | Gruber | G10L 15/265 |
| | | | | 704/235 |
| 2015/0019307 | A1 | 1/2015 | Girard et al. | |
| 2015/0371637 | A1* | 12/2015 | Neubacher | H04M 11/10 |
| | | | | 704/235 |
| 2016/0078773 | A1* | 3/2016 | Carter | G09B 7/02 |
| | | | | 434/353 |
| 2016/0093303 | A1* | 3/2016 | Yasrebi | G10L 15/26 |
| | | | | 709/206 |
| 2016/0301639 | A1 | 10/2016 | Liu et al. | |
| 2017/0069028 | A1* | 3/2017 | Narayana | G06Q 20/20 |
| 2017/0110128 | A1* | 4/2017 | Zhang | G10L 15/22 |
| 2017/0155605 | A1* | 6/2017 | Stephens | H04N 21/2743 |
| 2020/0082829 | A1* | 3/2020 | Taubman | G06F 16/9535 |

FOREIGN PATENT DOCUMENTS

| | | | |
|---|---|---|---|
| CN | 103377652 | A | 10/2013 |
| CN | 103532716 | A | 1/2014 |
| CN | 103677729 | A | 3/2014 |
| CN | 103812898 | A | 5/2014 |
| CN | 103903619 | A | 7/2014 |
| CN | 104216990 | A | 12/2014 |
| CN | 104462538 | A | 3/2015 |
| CN | 104469524 | A | 3/2015 |
| CN | 104754364 | A | 7/2015 |
| CN | 104794122 | A | 7/2015 |
| CN | 105100940 | A | 11/2015 |
| CN | 105869013 | A | 8/2016 |
| JP | 2003085426 | A * | 3/2003 |

OTHER PUBLICATIONS

The State Intellectual Property Office of the People's Republic of China (SIPO) Office Action 1 for 201610843710.X dated Jul. 20, 2020 10 Pages (including translation).

* cited by examiner

METHOD FOR PRESENTING VIRTUAL RESOURCE, CLIENT, AND PLUG-IN

RELATED APPLICATIONS

The present application claims priority to PCT Application No PCT/CN2017/096766, file on Aug. 10, 2017, which claims priority to Chinese Patent Application No. 201610843710.X, entitled "METHOD FOR PRESENTING VIRTUAL RESOURCE, CLIENT, AND PLUG-IN" filed with the Chinese Patent Office on Sep. 22, 2016. The two applications are incorporated by reference in their entirety.

FIELD OF THE TECHNOLOGY

The present application relates to the field of Internet technologies, and in particular, to a method for presenting a virtual resource, a client, and a plug-in thereof.

BACKGROUND OF THE DISCLOSURE

With the rapid development of Internet services, a user may carry out various social activities on social platforms. In addition to a user carrying out social activities with a friend, a merchant or an advertiser may also interact with the user on a social platform. For example, the advertiser may push an advertisement to the user. When pushing out advertisements, the advertiser may push out different forms of virtual resources. The virtual resources, for example, can be red packets (cash gifts), shopping vouchers, and various coupons, to attract users.

SUMMARY

In view of the above, the present application provides a method for presenting a virtual resource, a client, and a plug-in, to improve activity of users and resource utilization of a client when the virtual resource is presented.

Technical solutions of the present disclosure is implemented in the following manners.

One aspect of the present disclosure provides a method for presenting a virtual resource. The method includes: receiving a virtual resource associated with a piece of push information, and first text information associated with the push information from a server; and presenting the first text information and prompt information, the prompt information prompting a user to input an audio data input to obtain the virtual resource. Further, the method includes: receiving audio data input by the user, obtaining an audio file data packet; uploading the audio data packet to the server for audio recognition; receiving second text information returned by the server, and determining an interaction result according to the first text information and the second text information; and presenting the virtual resource and sending a virtual resource activation acknowledgment message to the server based on the interaction result.

A second aspect of the disclosure further provides a client, including a processor and a memory, the memory storing instructions that can be executed by the processor, and when the instructions are executed, the processor being configured to: receive a virtual resource associated with a piece of push information and first text information of the push information from a server and present the first text information and prompt information, the prompt information prompting a user to input an audio file to obtain the virtual resource. Further, the processor is configured to receive audio data input by the user, obtain an audio file data packet; upload the audio data packet to the server for audio recognition, receive second text information returned by the server, and determine an interaction result according to the first text information and the second text information; and present the virtual resource and send a virtual resource activation message to the server when the interaction result indicates that the audio data is correct.

Another aspect of the present disclosure provides a plug-in, comprising a processor and a memory, the memory storing instructions that can be executed by the processor. When the instructions are executed, the processor being configured to: receive a virtual resource associated with a piece of push information and first text information of the push information from a server and send the virtual resource and the first text information to a client. The client presents the first text information and prompt information. The prompt information prompting the user to input an audio data input to obtain the virtual resource.

The processor is further configured to receive audio data input by the user; receive second text information returned by the server; process the audio data input to obtain an audio file data packet; upload the audio data packet to the server for audio recognition; determine an interaction result according to the first text information and the second text information; and send a virtual resource activation acknowledgment message to the server when the interaction result indicates that the audio data is correct.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some embodiments of the present application rather than all of the embodiments. All other embodiments obtained by persons skilled in the art based on the embodiments of the present application without creative efforts shall fall within the protection scope of the present application.

When a virtual resource is pushed to a user, an existing interaction form includes tapping a button, scanning a barcode, shake, or the like. The manner of user interactions may be relatively simple, relate to only one step of operation of a user, and lack real personal interactions with the user, which impairs the pushing effects and the resource utilization of a client.

In the present application, the push information may have a promotion function. For example, the push information may be an advertisement that is made by a merchant or an advertiser to promote commodities of the merchant or advertiser or is public benefit information that is published by a public benefit institute to promote a public benefit activity. A virtual resource associated with the push information are to be distributed to attract users. For example, the virtual resource may a red packet (cash gift) associated with an advertisement, aiming to attract a user to participate in the advertising campaign to receive the red packet. Alternatively, the virtual resource may be a participation voucher of a public benefit activity promoted by a government organization, aiming to attract a user to participate in the public benefit activity.

Figure 1:
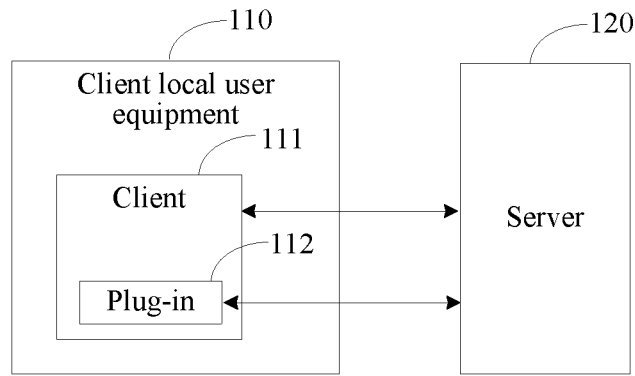
FIG. 1 is a schematic structural diagram of an implementation environment according to an embodiment of the present application.

FIG. 1 is a schematic structural diagram of an implementation environment according to an embodiment of the present application. As shown in FIG. 1, the implementation environment includes a local user equipment 110 and a server 120. A client 111 is installed in the local user equipment 110, and a plug-in 112 is installed on client 111.

When a virtual resource is presented, a screen of the local user equipment 110 provides a display interface for presenting the virtual resource, such as a red packet. For example, the local user equipment 110 may be a smartphone, a tablet computer, a laptop portable computer, and the like.

The client 111 may be an application (APP)-type client, configured to control presentation of a virtual resource in a page, recording of an audio file, processing of audio data, and determining of an interaction result, and may provide a social platform for social interaction between a user and friends. For example, the client 111 may be an instant messaging APP such as Wechat and Tecent QQ.

The plug-in 112 is configured to interact with the server to obtain content related to push information, for example, to obtain from the server an information flow order of an advertisement, including a virtual resource (such as a red packet) and text information (such as an advertising slogan) of the advertisement, and report related data to the server. In a specific implementation, the plug-in 112 may be used as an advertisement software development kit (SDK). In addition, in some embodiments, the plug-in 112 may also be responsible for executing the foregoing operations executed by the client, such as audio recording, processing of audio data, and determining of an interaction result.

The server 120 may be a server, or a server cluster including several servers, or a cloud computing service center, and is mainly configured to process audio recognition, collect statistics on and analyze an activity result, and the like. The local user equipment 110 and the server 120 may be connected by using a wireless network or wired network.

Figure 2:
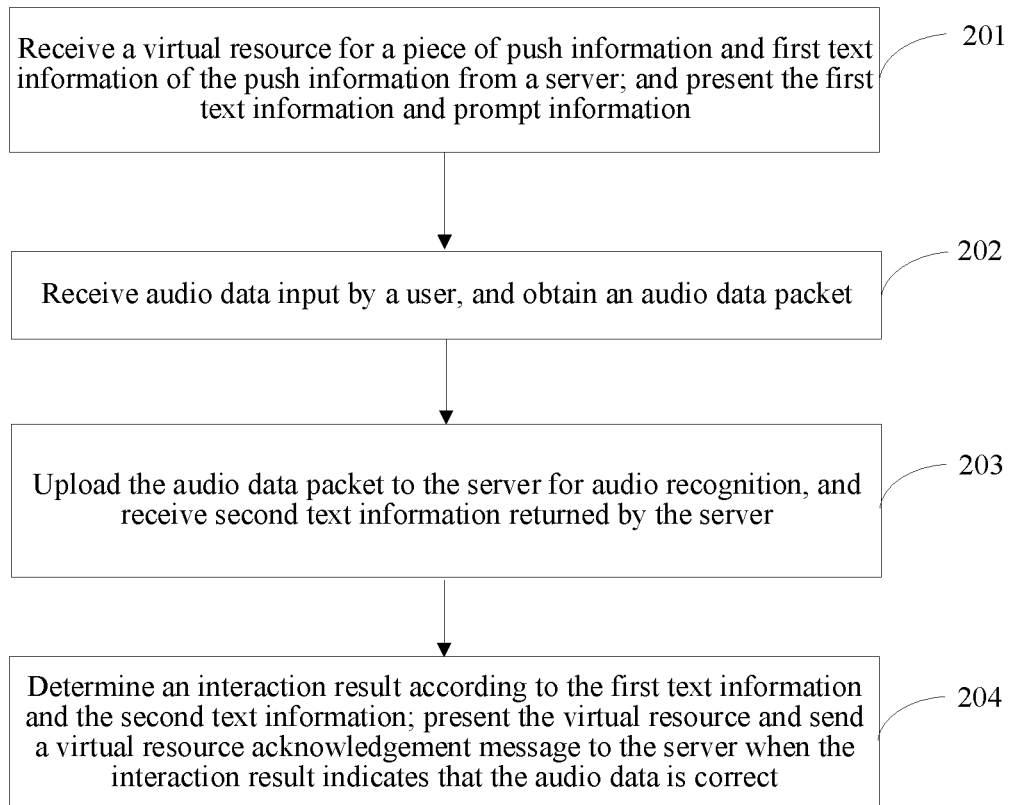
FIG. 2 is an exemplary flowchart of a method for presenting a virtual resource according to an embodiment of the present application.

FIG. 2 is an exemplary flowchart of a method for presenting a virtual resource according to an embodiment of the present application. The method is applied to a client. As shown in FIG. 2, the method may include the following steps.

Step 201: Receive a virtual resource associated with a piece of push information and first text information of the push information from a server; and present the first text information and prompt information.

In this step, a plug-in in the client pulls configuration information corresponding to the push information from the server and obtains the virtual resource and the first text information from the configuration information. For example, the configuration information is order information of an advertisement, including a download address of an advertisement picture, first text information (such as an advertising slogan), a virtual resource (such as a red packet of a certain monetary amount), and a preset threshold used when the client performs fuzzy matching. The configuration information may be a file in a structured data format, such as an XML file and a json format file.

After receiving the virtual resource, the client would not immediately present the virtual resource, but first presents the first text information and the prompt information. The first text information may be description information related to a text that a user needs to call out. The first text information may include a segment of text that the user needs to read, including words and numbers. For example, the first text information may be an advertising slogan pre-assigned by the advertiser or a slogan in a public benefit activity.

The prompt information is used to prompt the user to input an audio file to obtain the virtual resource. While presenting the prompt information, the client may further output options of audio input, for example, a microphone button, on an interface, so that the user can record when pressing the button and stops recording when releasing the button.

Figure 3:
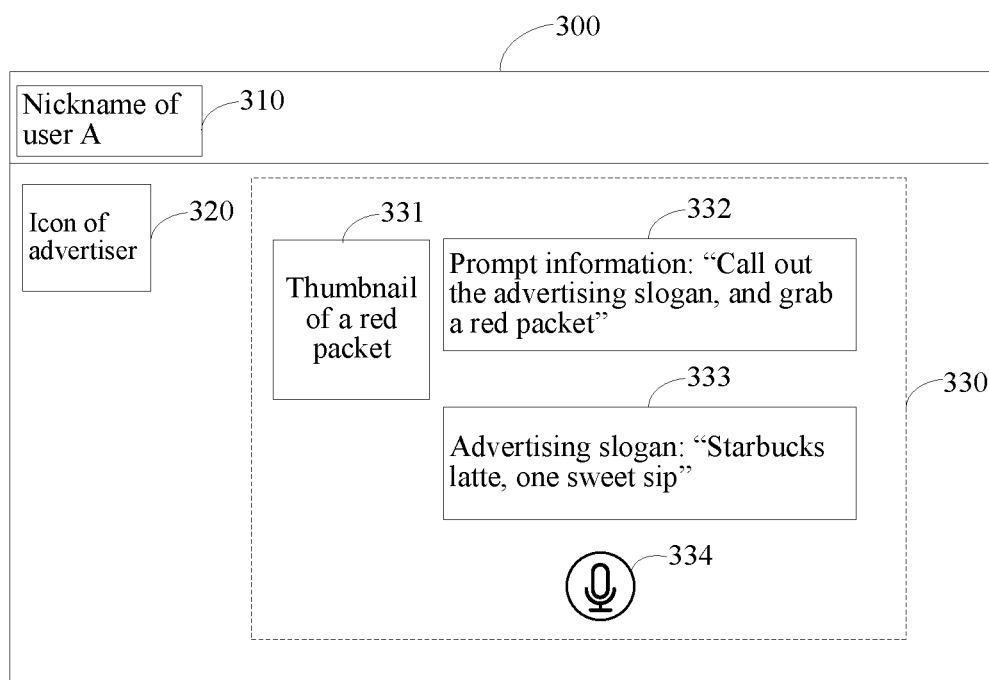
FIG. 3 is a schematic diagram of an interface for presenting first text information and prompt information according to an embodiment of the present application.

In on example, if the push information is an advertisement, the advertiser is Starbucks, the virtual resource is a red packet, and the first text information is an advertising slogan. FIG. 3 is an exemplary diagram of an interface for presenting first text information and prompt information according to an embodiment of the present application. As shown in FIG. 3, an interface 300 is a Wechat user interface. A nickname of a user A is displayed in a box 310; an icon of the advertiser, such as a logo of Starbucks, is displayed in a box 320; all information pushed by the advertiser is displayed in a box 330, including: a thumbnail of the red packet is displayed in a box 331, to prompt the user that the virtual resource is a red packet, the prompt information: "Call out the advertising slogan, and grab a red packet" is displayed in a box 332, an advertising slogan: "Starbucks latte, one sweet sip" is displayed in a box 333, and a microphone button 334 is displayed, so that the user may record and input an audio file.

Step 202: Receive audio data input by a user, and obtain an audio file data packet.

In this step, in response to a user operation, as shown in FIG. 3, the user presses the microphone button 334, and inputs a segment of audio according to an advertising slogan 333. After detecting that the user stops pressing (for example, a user releases a finger), the client obtains an audio file data packet.

In a specific implementation, in a process in which a user records an audio file, the client obtains environment volumes, calculates an average value, and displays a waveform on the interface according to the average value, to show a volume with which the user speaks. Alternatively, the client calculates a decibel value of the volume, and displays the waveform by replacing the average value with the decibel value.

Figure 4:
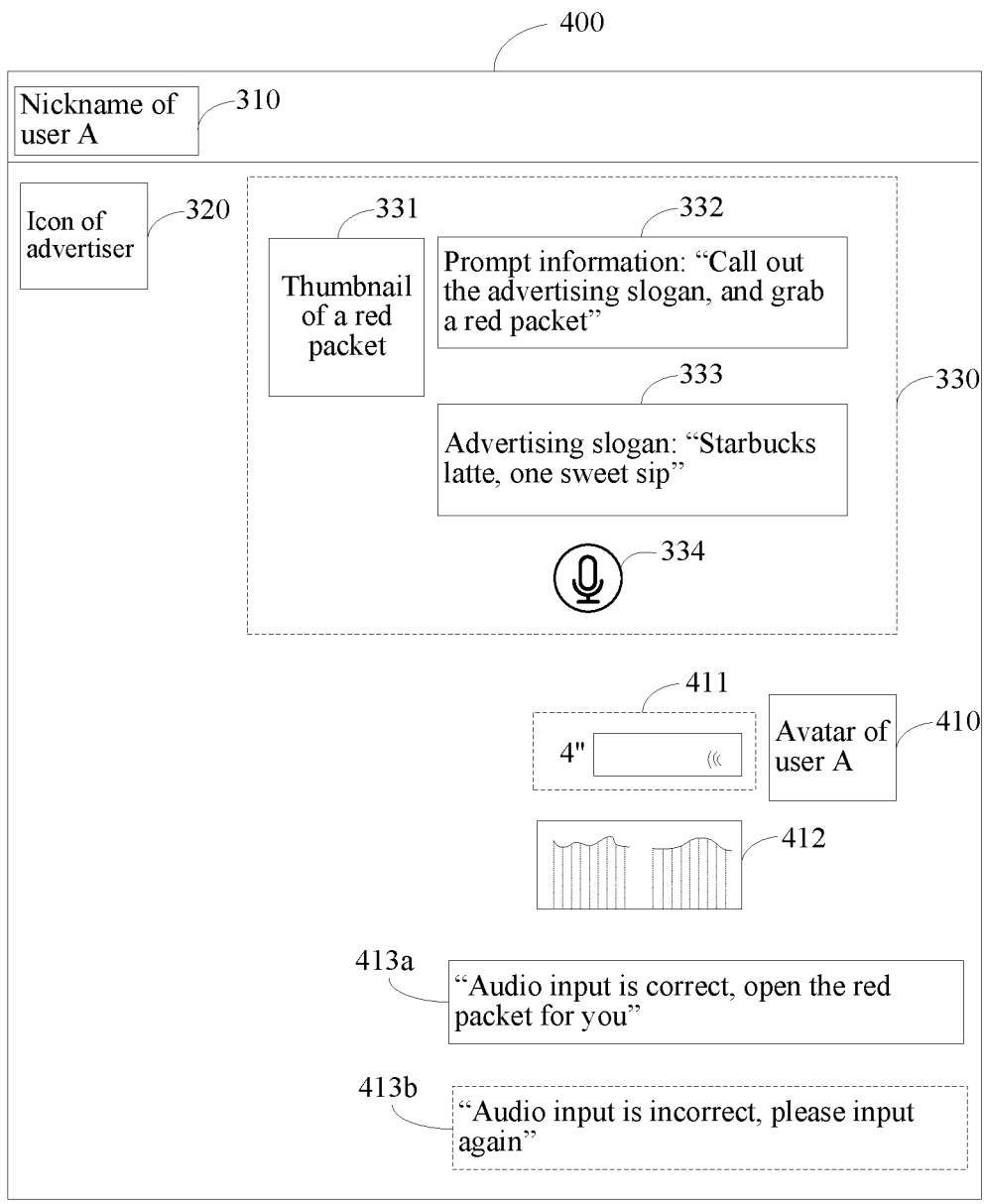
FIG. 4 is a schematic diagram of an interface for inputting an audio file according to an embodiment of the present application.

FIG. 4 is a schematic diagram of an interface for inputting an audio file according to an embodiment of the present application. As shown in FIG. 4, based on FIG. 3, a user A presses the microphone button 334 and calls out the advertising slogan "Starbucks latte, one sweet sip". After the audio recording, an audio file data bar with a length of about 4" is displayed in a box 411. Correspondingly, a volume waveform diagram of a current user audio is displayed in real time in a box 412.

Step 203: Upload the audio data packet to the server for audio data recognition, and receive second text information returned by the server.

In a specific implementation, the plug-in in the client first interacts with the server to complete authentication, and obtains and stores a token corresponding to the plug-in. The token is used as a global unique identifier of the plug-in and is used when the client calls interfaces. In addition, the client pre-configures an identifier (AppID) of a developer, and accesses the server according to a uniform resource locator (URL) address of the server, to upload the audio data packet to the server.

Considering that the virtual resource pushed in the present application may be novel, for example, wording and a description manner of an advertising slogan are usually novel, the server may pre-configure a language library of the virtual resource, for example, a general word library for the advertising slogan. The server may perform audio recognition on the received audio data packet according to the general word library, converts the advertising slogan called out by the user into a text, generates the second text information, and returns the second text information to the client.

Step 204: Determine an interaction result according to the first text information and the second text information; present the virtual resource and send a virtual resource activation acknowledgment message to the server when the interaction result indicates that the audio data is correct.

In this step, the client uses the first text information as reference, matches the second text information recognized by the server with the first text information, and determines the interaction result, that is, determines whether the audio input by the user is consistent with the first text information. As shown in FIG. 4, if the interaction result displays that audio input is correct, "Audio input is correct, open the red packet for you" is displayed in a box 413*a*; if the interaction result displays that audio input is incorrect, "Audio input is incorrect, please input again" is displayed in a box 413*b*.

When the interaction result indicates that the audio input by the user is correct, the virtual resource, including an icon/image of an advertiser, a promotion slogan, a reward amount, and the like, is presented. In addition, the client sends the virtual resource activation acknowledgment message to the server, so that the server learns of successful recognition of this time and adds the obtained virtual resource to an account of the user, for example, adds a red packet amount obtained by the user to a wallet of the user.

In a specific implementation, the virtual resource may be presented based on operations of the user in two steps. That is, a button for the user to open the virtual resource is displayed in an interface, and then the virtual resource is presented in another interface in response to a click operation of the user on the button.

Figure 5A:
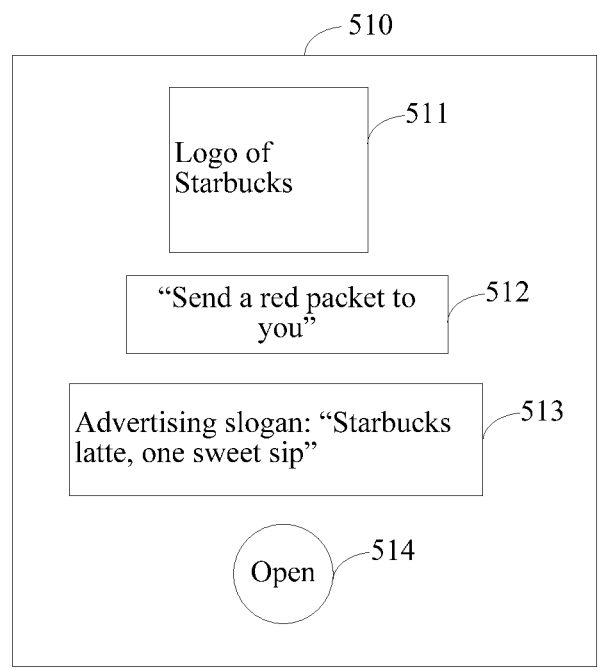
FIG. 5a is a schematic diagram of an interface for presenting a virtual resource according to an embodiment of the present application.

FIG. 5*a* is a schematic diagram of an interface for presenting a virtual resource according to an embodiment of the present application. As shown in FIG. 5*a*, in an interface 510, an icon of an advertiser, such as a logo of Starbucks, is displayed in a box 511; information "Send a red packet to you" is displayed in a box 512; that the promotion slogan is the advertising slogan:"Starbucks latte, one sweet sip" is displayed in a box 513; an "Open" button is output in a circle 514, so that the user can click the button to open the red packet.

Figure 5B:
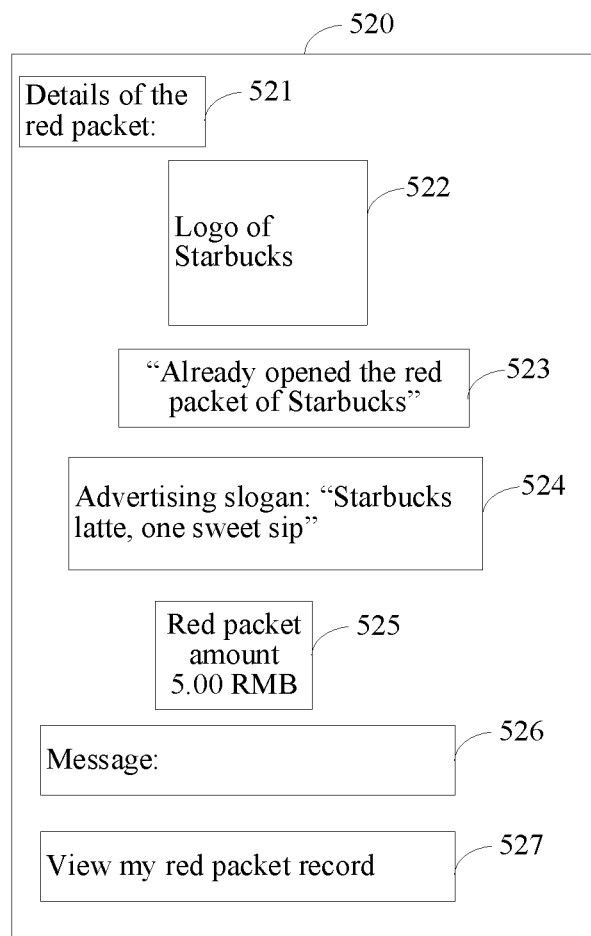
FIG. 5b is a schematic diagram of an interface for presenting a virtual resource according to another embodiment of the present application.

FIG. 5*b* is a schematic diagram of an interface for presenting a virtual resource according to another embodiment of the present application. As shown in FIG. 5*b*, in an interface 520, "Details of the red packet:" is displayed in a box 521, to indicate that the interface presents specific content of the red packet. The logo of Starbucks is displayed in a box 522; information "Already open the red packet of the advertiser" is displayed in a box 523; the advertising slogan "Starbucks latte, one sweet sip" is displayed in a box 524; "Red packet amount 5.00 RMB" is displayed in a box 525. In addition, a message option is output in a box 526, so that the user inputs a message of the user for the red packet; an option "View my red packet record" is output in a box 527, so that the user views whether the red packet is stored in the wallet and a historical record of previously received red packets.

It should be noted that the interface 510 may also be a window interface appearing in a form of a floating layer above the interface 400 shown in FIG. 4. The promotion slogan may be the advertising slogan shown in the box 513 or 524 or may be any other text information.

In this embodiment, a virtual resource associated with a piece of push information and first text information of the push information may be received from a server; the first text information and prompt information may be presented; audio data input by the user may be received. An audio file data packet may be obtained, the audio data packet may be uploaded to the server for audio recognition. Second text information returned by the server may be received, an interaction result may be determined according to the first text information and the second text information. The virtual resource may be presented, and a virtual resource activation acknowledgment message may be sent to the server when the interaction result indicates that the audio data is correct, implementing presentation of the virtual resource based on language recognition interaction; participation of the user is introduced between successful reception of the virtual resource and presentation of the virtual resource, enriching interaction formats between the advertiser and the user. Embodiments of the present disclosure may strengthen an impression of the user of the promotion information, and achieving an objective of in-depth interaction of the user in a promotion process, such as an advertising campaign. The virtual resource often has certain user rewarding properties, improving activity of the user and improving resource utilization when the client presents the virtual resource.

In addition, in a specific implementation, in the steps shown in FIG. 2, in addition to that the client is responsible for the presented steps, the plug-in may be configured to process other steps, including: step 201: Receive a virtual resource associated with a piece of push information and first text information of the push information from a server; step 202: receive audio data input by a user, and obtain an audio file data packet; step 203: upload the audio data packet to the server for audio recognition, and receive second text information returned by the server; step 204: determine an interaction result according to the first text information and the second text information; send a virtual resource activation acknowledgment message to the server. That is, the foregoing operations such as receiving from the server, recording of the audio, obtaining of the data packet, determining of the interaction result, and sending to the server may either be processed by the client or be specifically processed by the plug-in in the client.

The user audio data collected by using user equipment are usually linear uncoded data, for example, data in a PCM format. To compress a data volume, a proper transcoding scheme needs to be used for transcoding. The receiving audio data input by a user, and obtaining an audio file data packet in step 202 in FIG. 2 may be specifically while receiving the audio data, performing a transcoding operation and compressing audio data, that is, a transcoding-while-recording operation.

Figure 6:
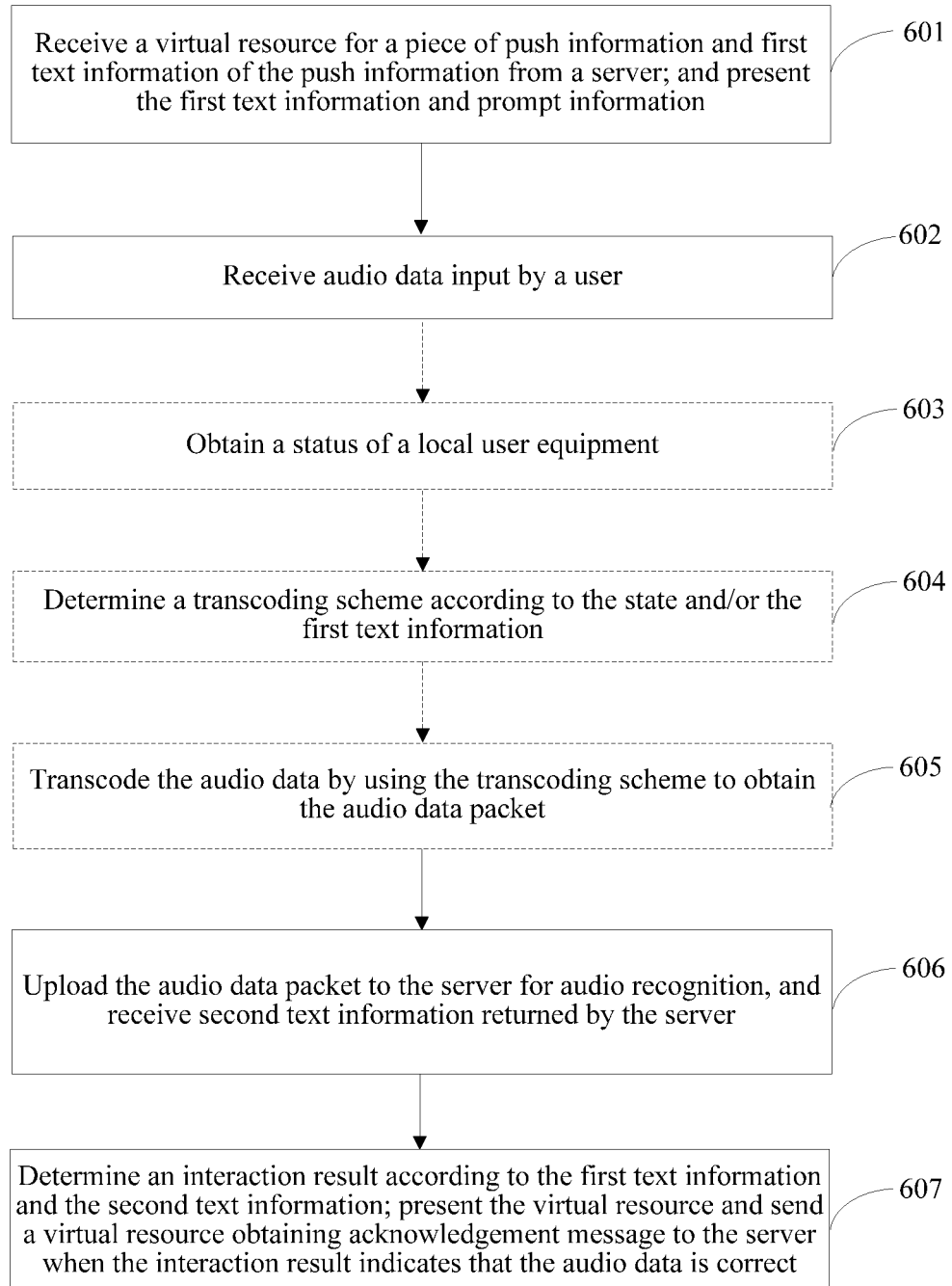
FIG. 6 is an exemplary flowchart of a method for presenting a virtual resource according to another embodiment of the present application.

For the foregoing process, FIG. 6 provides an exemplary flowchart of a method for presenting a virtual resource according to another embodiment of the present application. As shown in FIG. 6, the method includes the following steps:

Step 601: Receive a virtual resource associated with a piece of push information and first text information of the push information from a server; and present the first text information and prompt information.

Step 602: Receive audio data input by a user.

Step 603: Obtain a status of a local user equipment.

Herein, the status of the local user equipment may be status information that can show a processing capability of the user equipment, including hardware information, software information, and network information. The hardware information and software information of the user equipment of the user equipment may be related to a transcoding speed and types of a transcoding algorithm that are supported by the user equipment. The network information of the user equipment may be related to a transmission speed of an audio file data packet obtained after transcoding.

In an embodiment, a model of the local user equipment is obtained, and a device capability corresponding to the model is determined according to a correspondence between preset device models and device capabilities as a status of the local user equipment. For example, several device capability levels, such as a high-capability device, a medium-capability device, and a low-capability device, may be preset. The correspondence between various device models and the device capability levels may also be preset. The preset correspondence may cover models of various user equipment popular at the market, such as models of mobile phones.

The correspondence may be provided by the server. In one embodiment, the local user equipment may regularly obtain the correspondence of the latest version from the server. Alternatively, the server may send a notification message to the user equipment after updating the correspondence, so that the local user equipment obtains the updated correspondence.

In another embodiment, network information of the local user equipment and/or a data transmission speed is obtained, and a network state of the local user equipment is determined according to a preset network type and/or a correspondence between network speeds and network states as the status of the local user equipment.

Herein, the network information is description information of a network used by the user equipment when communicating, for example, including information about a communication protocol (such as the 802.1 series protocol, the WCDMA protocol, and the CDMA2000 protocol), information about a network standard (such as WiFi, 2G, 3G, and 4G), and information about signal strength. In some examples, one or more of the communication protocol, the network standard, the signal strength, and the data transmission speed may be directly used as the network state. In some other examples, several network states, such as a high-speed network, a medium-speed network, and a low-speed network may be preset. Various network information and/or a correspondence between data transmission speeds and network states may be preset in the user equipment. The preset correspondence may cover models of various user equipment popular at the market, such as models of mobile phones. The correspondence may also be obtained by the user equipment from the server.

Step 604: Determine a transcoding scheme according to the state and/or the first text information.

In this step, a specific method for determining the transcoding scheme is: determining the transcoding scheme by using a correspondence between preset states and transcoding schemes; or determining the transcoding scheme by using a correspondence between preset lengths of the first text information and transcoding schemes; or determining the transcoding scheme by using a correspondence between preset states and lengths of the first text information and transcoding schemes.

In an embodiment, the correspondence is searched for a correspondence entry corresponding to the state and/or the length of the first text information, and a transcoding algorithm and parameter recorded in the entry are used as a transcoding scheme. The parameter includes at least one of: a sampling rate, the number of bytes needed by encoding of each audio sampling value, and the number of channels. Table 1 provides an example of a correspondence table, and the state is specifically divided into the device capability and the network state.

TABLE 1

Correspondence table of states and text lengths and transcoding schemes

| State | | | | Parameter | | |
|---|---|---|---|---|---|---|
| Device capability | Network state | Length of first text information | Transcoding algorithm | Sampling rate | Number of bytes needed by encoding of each audio sampling value | Number of channels |
| High-end device | Any | Any | Speex | 16K | Two bytes | Two channels |
| Any | WiFi or 4G | Any | | | | |
| Any | Any | No more than six words | | | | |
| Low-end device | Any | Any | AMR | 8K | One byte | One channel |
| Any | Not WiFi and not 4G | Any | | | | |
| Any | Any | More than six words | | | | |
| | Another situation | | Speex | 8K | Two bytes | One channel |

In another embodiment, the correspondence is searched for a first entry corresponding to the state and/or the length of the first text information, and a transcoding algorithm recorded in the first entry is obtained. The correspondence is searched for a second entry corresponding to the network state and/or the length of the first text information, a parameter recorded in the second entry is obtained, and the obtained transcoding algorithm and parameter are used as a transcoding scheme. The parameter includes one of: a sampling rate, a frame rate, the number of bytes needed by encoding of each audio sampling value, and the number of channels.

Step 605: Transcode the audio data by using the transcoding scheme to obtain the audio data packet.

When the client is a Wechat client, for the transcoding scheme used in a Wechat platform, in one example, Speex may be a more preferable solution than PCM, AAC, and AMR algorithms. Specifically, Speex has processing such as noise reduction and is very suitable for network transmission. In addition, Speex coding is based on frames instead of processing of entire file data. PCM format data is encoded based on frames and by defining the length of a frame and then is decoded into PCM audio data for processing. In addition, the manner of Speex based on frames also facilitates streaming coding, that is, uploading while encoding while recording, thereby saving an entire processing time.

Parameters in the Speex solution in the Wechat platform are set as follows:

```
int modelID=SPEEX_MODEID_WB;
SpeexMode*mode=Speex_lib_get_mode(modelID);
void*state=Speex_encoder_init(mode);
SpeexBits bits;
int rate=16000;
int complexity=3;
int frame_size=640;
int quality=7;
Speex_bits_init(&bits);
Speex_encoder_ctl(state,       SPEEX_SET_QUALITY,
&quality);
Speex_encoder_ctl(state,  SPEEX_GET_FRAME_SIZE,
&frame_size);
Speex_encoder_ctl(state,  SPEEX_SET_COMPLEXITY,
&complexity);
Speex_encoder_ctl(state,       SPEEX_SET_SAMPLIN-
G_RATE, &rate);
```

Specific to features of the Wechat platform, some corresponding processing is required when the Speex solution is used. The processing specifically may include the following:

1) A source code is modified; because a gcc compiler of Xcode cannot recognize the buttonword, an EXPORT buttonword is removed.

2) An independent project is established, an Speex source code is put into the project, and then the project is linked to a needed project; in this way, Speex may perform compilation along with a parent project, and code is relatively independent.

3) Considering that a Speex library may also be used in other items, for example, the library is built in a Wechat audio SDK and an Apollo audio SDK; because a Speex header file is not exposed, an advertisement needs to avoid that a library name is repeated.

Step 606: Upload the audio data packet to the server for audio recognition, and receive second text information returned by the server.

Step 607: Determine an interaction result according to the first text information and the second text information; present the virtual resource and send a virtual resource activation acknowledgment message to the server when the interaction result indicates that the audio data is correct.

For descriptions of steps 601, 602, 606, and 607, refer to steps 201 to 204 in FIG. 2. Details are not described herein.

In the foregoing embodiment, the transcoding scheme of the audio is determined according to the state of the local user equipment and the first text information, and a transcoding operation is performed while recording, thereby avoiding a long time consumed by entire transcoding. As a result, the user equipment can efficiently transcode the audio input by the user to obtain the audio data packet, thereby reducing a time consumed by audio processing in an audio file interaction process, and making the interaction process more smooth.

Figure 7:
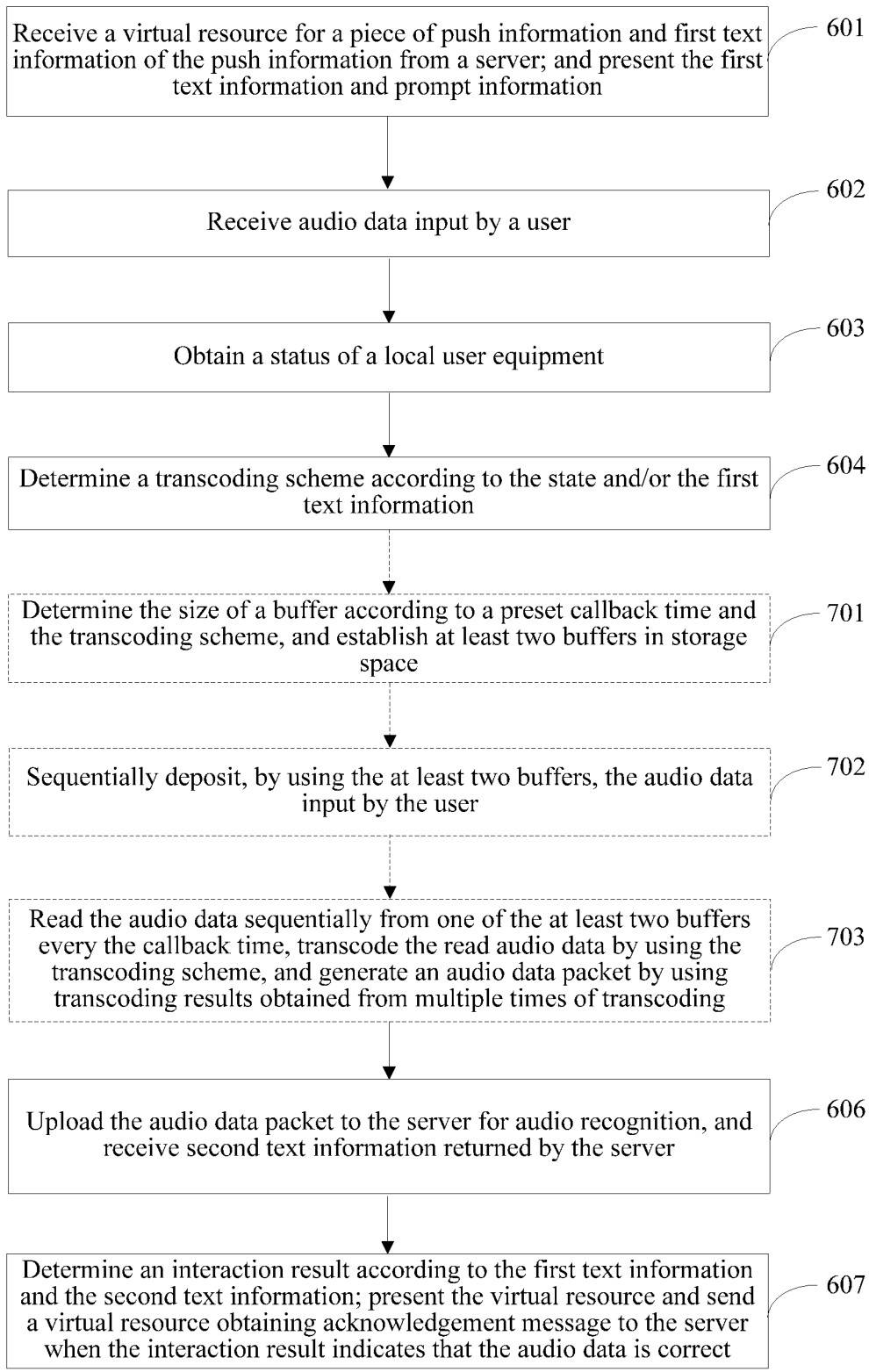
FIG. 7 is an exemplary flowchart of a method for presenting a virtual resource according to still another embodiment of the present application.

When performing transcoding processing, the client may also establish a buffer in storage space, deposit the audio input by the user by using the buffer, and read the audio data from the buffer for transcoding. FIG. 7 is an exemplary flowchart of a method for presenting a virtual resource according to still another embodiment of the present application. As shown in FIG. 7, step 605 in FIG. 6 is further expanded into steps 701 to 703 in FIG. 7.

Step 701: Determine the size of a buffer according to a preset callback time and the transcoding scheme, and establish at least two buffers in storage space.

The size of each buffer is equal to the size of the determined buffer. In one embodiment, a product of the callback time, a sampling rate in the transcoding scheme, and the number of bytes needed by encoding of each audio sampling value is used as the size of the buffer. For example, the callback time is 0.1 s, the sampling rate is 16 k, and the number of needed bytes is eight.

Step 702: Sequentially deposit, by using the at least two buffers, the audio data input by the user.

Step 703: Read the audio data sequentially from one of the at least two buffers every the callback time, transcode the read audio data by using the transcoding scheme, and generate an audio file data packet by using transcoding results obtained from multiple times of transcoding.

Herein, the manner of reading the audio data from the at least two buffers may be during each callback, determining, according to an audio file depositing sequence, a buffer that should be read during local callback, and read the audio data from the buffer.

For example, assuming that there are buffers a, b, and c, the audio data received gradually may first be stored in the buffer a, after the buffer a is full, the audio data may be stored in the buffer b, and then the audio data may bestored in the buffer c. During first callback, the user equipment reads the audio data from the buffer a. During second callback, the user equipment reads the audio data from the buffer b. During third callback, the user equipment reads the audio data from the buffer c. During fourth callback, the user equipment reads the audio data from the buffer a. The rest may be deduced by analogy until all audio data is completely read. The user equipment may splice results of multiple times of transcoding according to a sequence to generate an audio file data packet.

In the foregoing embodiment, the user audio may be stored by using the buffer and may be regularly called back, thereby performing transcoding while recording, shortening a time needed by a transcoding process, and improving processing efficiency of transcoding.

Figure 8:
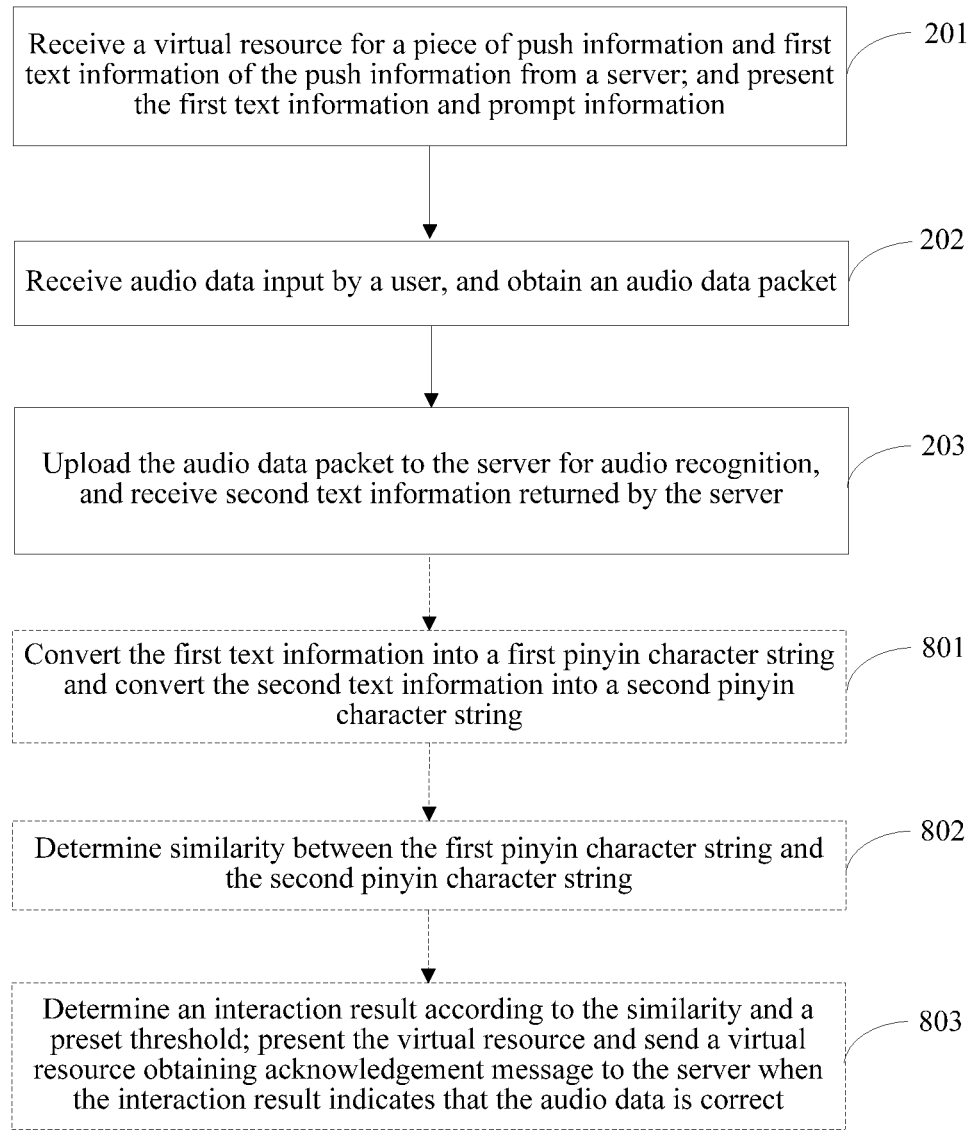
FIG. 8 is an exemplary flowchart of a method for presenting a virtual resource according to an embodiment of the present application.

For step 204 in FIG. 2, the interaction result may be determined according to the first text information and the second text information by using a fuzzy matching method. FIG. 8 is an exemplary flowchart of a method for presenting a virtual resource according to an embodiment of the present application. As shown in FIG. 8, step 204 is further expanded into steps 801 to 803.

Step 801: Convert the first text information into a first pinyin character string and convert the second text information into a second pinyin character string. Pinyin character strings are used to analyze user audio inputs spoken in Chinese. It is obvious that in embodiments of the present disclosure, depending on the language used by the user to record his audio input, the client may convert audio inputs to character strings corresponding to the language used.

In this step, the client converts the first text information into the first pinyin character string according to pronunciation of the first text information. A specific method is: converting the first text information into the first pinyin character string according to a preset pinyin conversion rule table and a preset fuzzy pinyin conversion rule table, where the fuzzy pinyin conversion rule table uses an accent feature.

The client may store a preset pinyin conversion rule table at the local user equipment, and converts the first text information into an accurate pinyin character string according to accurate pronunciation of the first text information.

In addition, a feature of audio interaction is that an accurate text recognition result is not needed, that is, a finally recognized word does not need to be presented to the user, and it is button to determine that pronunciation of the user is close to pronunciation of a preset advertising slogan. Therefore, the client locally stores a preset fuzzy pinyin conversion rule table having a dialect accent feature at the user equipment. The first text information is converted into a fuzzy pinyin character string by using the fuzzy pinyin conversion rule table.

For example, according to the Chinese dialect accent features, pronunciation in some places is affected by alveolars and retroflexes and velar nasals. "zh", "ch", and "sh" are respectively pronounced as "z", "c", and "s"; "in", "en", and "un" are respectively pronounced as "ing", "eng", "ung"; "n" is pronounced as "l". For example, "chi" is pronounced as "ci", "yin" is pronounced as "ying", "nong" is pronounced as "long", and "shan" is pronounced as "san". The fuzzy pinyin conversion rule table uses these features. For example, according to the fuzzy pinyin conversion rule table, an advertising slogan "nong fu shan quan" is converted into ""long fu san quan", "long fu shan quan", "nong fu san quan", and the like.

Hence, the first text information is converted into an accurate pinyin character string according to the preset pinyin conversion rule table or is converted into one or more fuzzy pinyin character strings according to the preset fuzzy pinyin conversion rule table. These pinyin character strings constitute the first pinyin character string. That is, the first pinyin character string includes an accurate pinyin character string and at least one fuzzy pinyin character string.

Similarly, according to the foregoing manner for converting the first pinyin character string, the second text information is separately converted into the accurate pinyin character string and the fuzzy pinyin character string according to the preset pinyin conversion rule table and according to the preset fuzzy pinyin conversion rule table, so as to obtain the second pinyin character string.

For example, the second text information recognized by the server is "nong fu shan tian". According to the preset pinyin conversion rule table and the preset fuzzy pinyin conversion rule table, the recognized "nong fu shan tian" is separately converted into an accurate pinyin character string "nong fu shan tian" and a fuzzy pinyin character string "long fu san tian", "long fu shan tian", and "nong fu san tian".

Step 802: Determine similarity between the first pinyin character string and the second pinyin character string.

Specifically, the minimum number of times of editing needed by conversion from the first pinyin character string into the second pinyin character string may be calculated by using a character string similarity algorithm. Then, the similarity between the first pinyin character string and the second pinyin character string may be calculated according to the minimum number of times of editing and the length of the longer one of the first pinyin character string and the second pinyin character string.

The character string similarity algorithm may be, for example, an edit distance algorithm (e.g., Levenshtein Distance or Edit Distance). The edit distance algorithm may be, between two character strings, calculating the minimum number of times of editing needed by conversion from one character string into the other character string. The larger needed number of times of editing indicates a longer distance between the two character strings and a greater difference between the two character strings. An edit operation, for example, includes: replacing one character of the character strings with the other character, inserting a character, deleting a character, and the like.

For example, two edit operations are needed to convert a first pinyin character string "xing ba ke na tai yi kou tian mei" into a second pinyin character string "xing ba ke na tie yi kou tian mei"; "a" is replaced with "i", and "i" is replaced with "e".

Then, the similarity is calculated by using the following formula:

$$\text{similarity}=1-\text{the number of times of editing/the length of the longer one of the character strings} \quad (1)$$

A length unit of the character strings is bytes, a numerical part thereof is used, and for example, accuracy of two decimals is used as the similarity. In the foregoing example, the calculated similarity=1-2/25=0.92.

In a specific implementation, a Math.Max( ) function in the JavaScript language may be used to return the length of the longer one of two character strings for comparison, for example, Math. Max (str1.length, str2.length); "str1.length" is the length of the first pinyin character string, and "str2.length" is the length of the second pinyin character string.

According to the method in step 801, both the first pinyin character string and the second pinyin character string includes the accurate pinyin character string and the fuzzy pinyin character string, that is, include a plurality of pinyin character strings. If the client matches that similarity between two pinyin character strings is greater than a preset threshold, that the audio input by the user is correct may be determined, and subsequent matching is no longer performed. If after the client matches all first pinyin character strings and second pinyin character strings, no first pinyin character string and second character pinyin character string have similarity greater than the preset threshold, that the audio input by the user is incorrect is determined.

Step 803: Determine an interaction result according to the similarity and a preset threshold; present the virtual resource and send a virtual resource activation acknowledgment message to the server when the interaction result indicates that the audio data is correct.

After the similarity between the first pinyin character string and the second pinyin character string is calculated, the client may determine the interaction result of the user and the virtual resource according to the preset threshold. The preset threshold may be contained in configuration information pulled by the client from the server. If the preset threshold is 0.7, if the similarity between the first pinyin character string and the second pinyin character string is greater than 0.7, it is considered that the audio input by the user is correct and is consistent with the first text information provided by the advertiser. If the similarity is lower than the threshold, it is considered that the audio input by the user is incorrect, the user may be made to input again, and then determining is performed.

In the foregoing embodiment, the dialect accent features are used, improving a recognition rate of an advertising slogan called out by the user. As a result, a possibility of matching between the advertising slogan called out by the user and an advertising slogan provided by an advertiser increases, satisfying a requirement that accuracy may not be very high in an advertising case and improving a success rate of user interaction and experience of the user.

The preset threshold may be assigned by the advertiser and controls a success rate of interaction, to control effects and costs of advertisement interaction. In addition, the server may dynamically adjust the preset threshold by negotiating with the advertiser. For example, the server may be collect statistics on success rates of a plurality of users in calling out the advertising slogan. When the success rate of the user in saying the advertising slogan is relatively low, the preset threshold may be lowered. When the success rate of the user in saying the advertising slogan is relatively high, the preset threshold may be increased.

Figure 9:
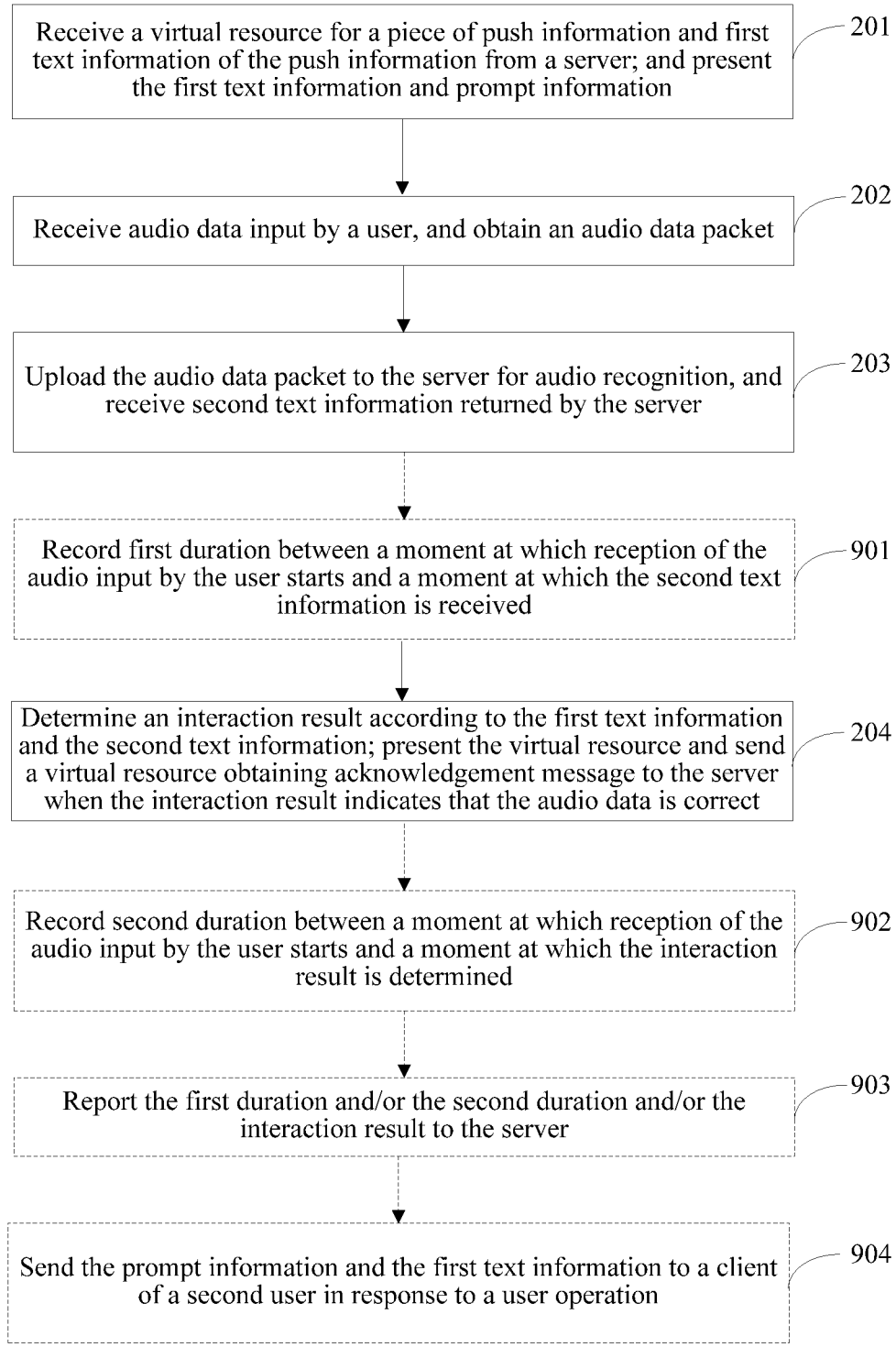
FIG. 9 is an exemplary flowchart of a method for presenting a virtual resource according to another embodiment of the present application.

FIG. 9 is an exemplary flowchart of a method for presenting a virtual resource according to another embodiment of the present application. As shown in FIG. 9, based on FIG. 2, FIG. 9 further includes steps 901 to 904.

After step 203 is performed, perform step 901: Record first duration between when reception of the audio input by the user starts and when the second text information is received.

Processing covered by the first duration includes: starting, by the user, to record, transcoding while recording, uploading the audio data packet to the server, performing, by the server, audio recognition, and receiving the second text information returned by the server. In this way, the server can collect, according to the first duration, statistics on a time consumed by completion of audio recognition once.

After step 204 is performed, perform step 902: Record second duration between when reception of the audio input by the user starts and when the interaction result is determined.

Compared with the first duration, processing covered by the second duration further includes: determining, by the client, the interaction result according to the first text information and the second text information. In this way, the server can collect, according to the second duration, statistics on a time consumed by completion of interaction once and can accumulate the total number of times of trying to recognize an advertisement through an audio file by the user.

Step 903: Report the first duration and/or the second duration and/or the interaction result to the server.

In this way, the server can collect statistics on the number of times of successful recognition according to the interaction result.

In addition, a success rate of using by the user can also be estimated by using the number of times of successful recognition and the total number of times of trying to recognize an advertisement through an audio file by the user obtained in step 902.

Step 904: Send the prompt information and the first text information to a client of a second user in response to a user operation. The second user is any user on a social relationship chain of the user, to prompt the second user to input an audio file to obtain the virtual resource.

Figure 10:
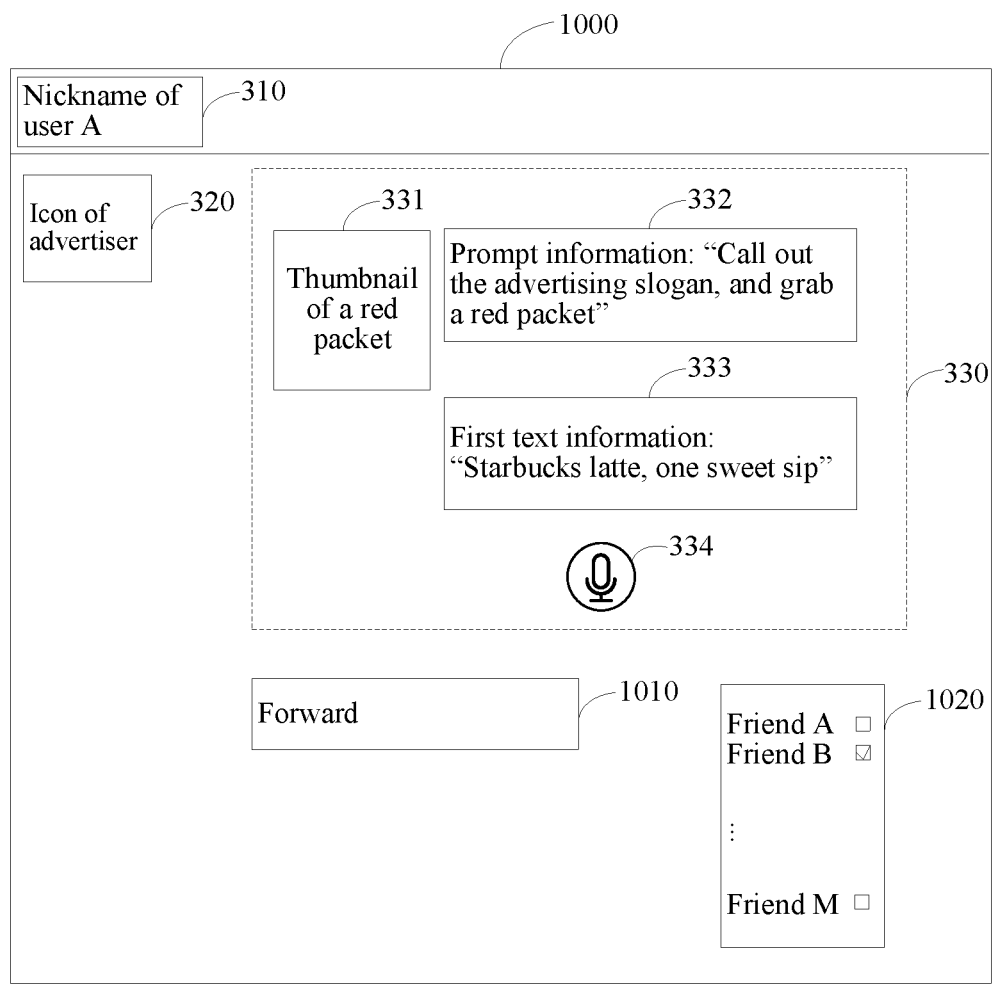
FIG. 10 is a schematic diagram of an interface for forwarding a virtual resource according to an embodiment of the present application.

In this step, sharing between the user and a friend is implemented by forwarding the prompt information and the first text information. Based on FIG. 3, FIG. 10 is a schematic diagram of an interface for forwarding a virtual resource according to an embodiment of the present application. As shown in FIG. 10, after the user taps the box 330 and holds for a period of time, a forward option 1010 is presented in a form of a floating layer in an interface 1000. After the user taps the forward option, a list of all friends is presented in another floating layer 1020, and a friend A, a friend B . . . , a friend M and corresponding select small boxes are presented. After the user selects a friend, for example, the friend B (√ is displayed in the small box), the client forwards whole content in the box 330 to a client in which the friend B is, and the content includes the prompt information and the first text information (that is, the advertising slogan). Therefore, after the friend B receives the content, if the friend B wants to open the red packet, the friend B also needs to tap the microphone button 334 to input an audio file and calls out the advertising slogan.

In the foregoing embodiment, related data in a process of completion of audio interaction once is reported to the server, to carefully supervise interaction effects, so that the advertiser can adjust a promotion solution of an interaction advertisement. For example, if the success rate of using by the user is relatively low, and the number of times of opening of the red packet is relatively small, the preset threshold is lowered when the client determines the interaction result, to improve enthusiasm of the user in participating in grabbing the red packet. Alternatively, the advertiser increases an amount in the red packet, to attract more users to participate in interaction.

In addition, a link of opening the red packet is forwarded to other users, thereby further spreading such an audio file interaction type advertisement, achieving effects of virus spreading of the advertisement, further enhancing promotion of the advertisement, and increasing presentation depth of the virtual resource by using a social platform.

Figure 11:
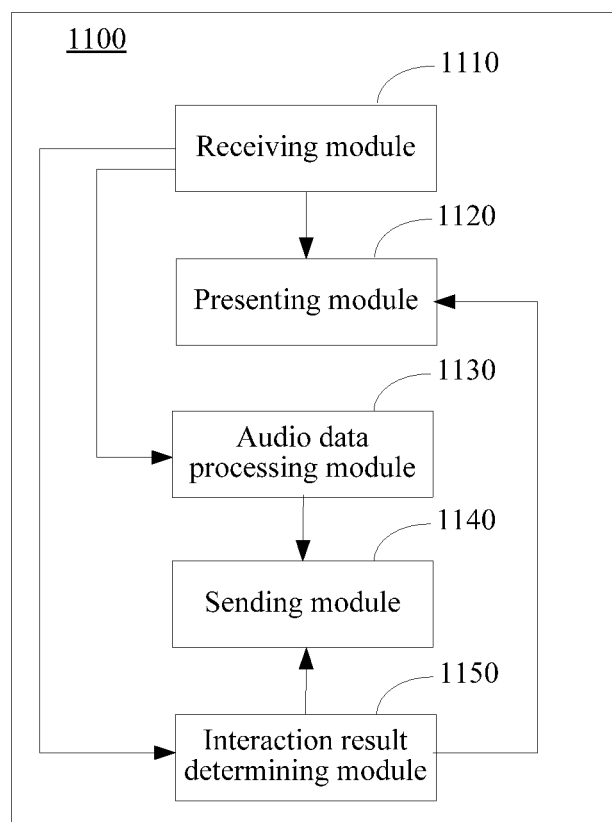
FIG. 11 is a schematic structural diagram of a client according to an embodiment of the present application.

FIG. 11 is a schematic structural diagram of a client according to an embodiment of the present application. As shown in FIG. 11, the client 1100 includes: a receiving module 1110, a presenting module 1120, an audio file data processing module 1130, a sending module 1140, and an interaction result determining module 1150, where the receiving module 1110 is configured to: receive a virtual resource associated with a piece of push information and first text information of the push information from a server; receive audio data input by a user; and receive second text information returned by the server.

The presenting module 1120 is configured to: present the first text information received by the receiving module 1110 and prompt information, the prompt information prompting the user to input an audio file to obtain the virtual resource; and when an interaction result determined by the interaction result determining module 1150 indicates that the audio data is correct, present the virtual resource received by the receiving module 1110.

The audio data processing module 1130 is configured to process the audio data received by the receiving module 1110, to obtain an audio file data packet. The sending module 1140 is configured to: upload the audio data packet obtained by the audio data processing module 1130 to the server for audio recognition; and send a virtual resource activation acknowledgment message to the server when the interaction result determined by the interaction result determining module 1150 indicates that the audio data is correct; and the interaction result determining module 1150 is configured to determine the interaction result according to the first text information and the second text information that are received by the receiving module 1110.

In an embodiment, the audio data processing module 1130 is configured to: obtain a status of a local user equipment; determine a transcoding scheme according to the status and/or the first text information; and transcode the audio data by using the transcoding scheme to obtain the audio data packet.

Figure 12:
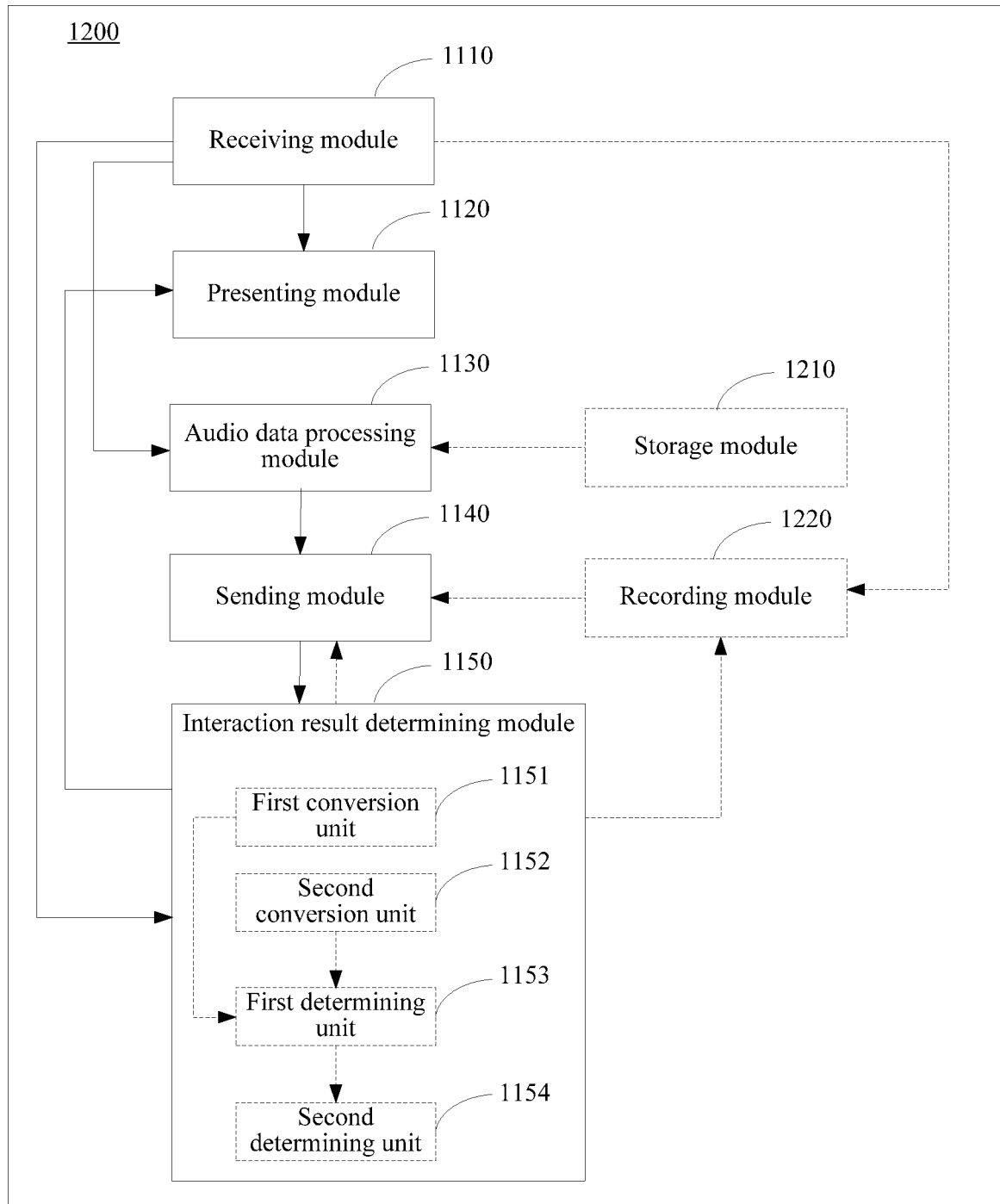
FIG. 12 is a schematic structural diagram of a client according to another embodiment of the present application.

FIG. 12 is a schematic structural diagram of a client according to an embodiment of the present application. As shown in FIG. 12, based on modules shown in FIG. 11, the client 1200 further includes: a storage module 1210, configured to: establish a buffer in storage space, and deposit, by using the buffer, the audio data input by the user; and the audio data processing module 1130 is further configured to read the audio data from the buffer for transcoding.

In an embodiment, the interaction result determining module 1150 includes: a first conversion unit 1151, configured to convert the first text information into a first pinyin character string; and a second conversion unit 1152, configured to convert the second text information into a second pinyin character string. The interaction result determining module 1150 may further include: a first determining unit 1153, configured to determine similarity between the first pinyin character string converted by the first conversion unit 1151 and the second pinyin character string converted by the second conversion unit 1152; and a second determining unit 1154, configured to determine the interaction result according to the similarity determined by the first determining unit 1153 and a preset threshold.

In an embodiment, the first conversion unit 1151 is configured to: convert the first text information into the first pinyin character string according to a preset pinyin conversion rule table and a preset fuzzy pinyin conversion rule table, the fuzzy pinyin conversion rule table using an accent feature; and the second conversion unit 1152 is configured to: convert the second text information into the second pinyin character string according to the preset pinyin conversion rule table and the preset fuzzy pinyin conversion rule table.

In an embodiment, the first determining unit 1153 is configured to: calculate, by using a character string similarity algorithm, the minimum number of times of editing needed by conversion from the first pinyin character string into the second pinyin character string; and calculate the similarity between the first pinyin character string and the second pinyin character string according to the minimum number of times of editing and the length of the longer one of the first pinyin character string and the second pinyin character string.

In an embodiment, the sending module 1140 is further configured to: send the prompt information and the first text information to a client of a second user in response to a user operation, the second user being any user on a social relationship chain of the user, to prompt the second user to input an audio file to obtain the virtual resource.

In an embodiment, the client 1200 further includes: a recording module 1220, configured to record first duration between when the receiving module 1110 starts to receive the audio input by the user and when the second text information is received; and the sending module 1140 is further configured to: report the first duration recorded by the recording module 1220 to the server, so that the server collects, according to the first duration, statistics on a time consumed by completion of audio recognition once; and/or the recording module 1220 is configured to record second duration between when the receiving module 1110 starts to receive the audio input by the user and when the interaction result determining module 1150 determines the interaction result. The client 1200 may further include: the sending module 1140 is further configured to report the second duration recorded by the recording module 1220 to the server, so that the server collects, according to the second duration, statistics on a time consumed by completion of interaction once; and/or the sending module 1140 is further configured to report the interaction result determined by the interaction result determining module 1150 to the server, so that the server collects statistics on the number of times of successful recognition according to the interaction result.

Figure 13:
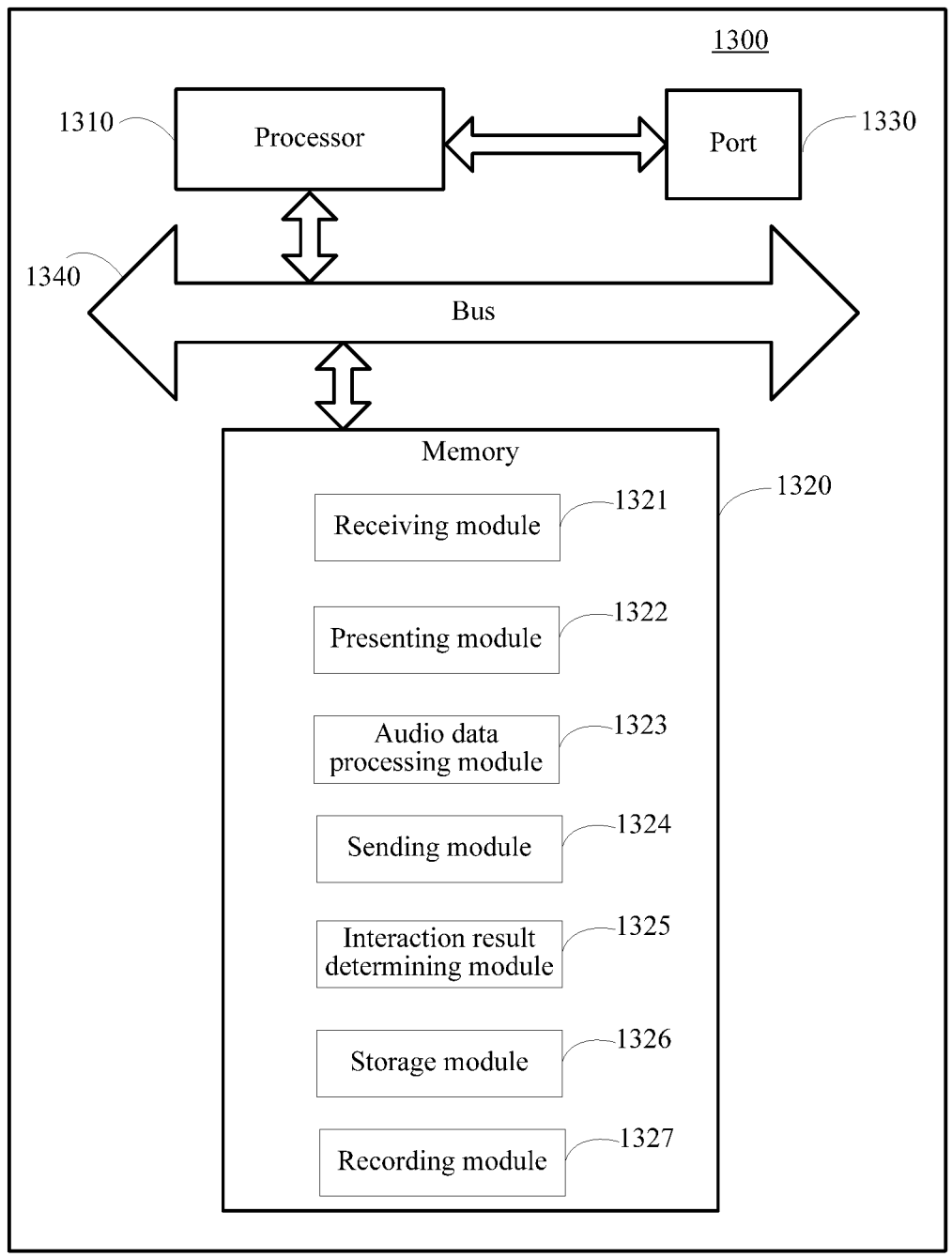
FIG. 13 is a schematic structural diagram of a client according to still another embodiment of the present application.

FIG. 13 is a schematic structural diagram of a client according to another embodiment of the present application. The client 1300 may include a processor 1310, a memory 1320, a port 1330, and a bus 1340. The processor 1310 and the memory 1320 are interconnected by using the bus 1340. The processor 1310 receives and sends data by using the port 1330. The processor 1310 is configured to execute machine readable instruction modules stored in the memory 1320.

The memory 1320 stores the machine readable instruction modules that can be executed by the processor 1310. The instruction modules that can be executed by the processor 1310 include: a receiving module 1321, a presenting module 1322, an audio file data processing module 1323, a sending module 1324, and an interaction result determining module 1325. When being executed by the processor 1310, the receiving module 1321 may be configured to: receive a virtual resource associated with a piece of push information and first text information of the push information from a server; receive audio data input by a user; and receive second text information returned by the server.

When being executed by the processor 1310, the presenting module 1322 may be configured to: present the first text information received by the receiving module 1321 and prompt information, the prompt information prompting the user to input an audio file to obtain the virtual resource; and when an interaction result determined by the interaction result determining module 1325 indicates that the audio data is correct, present the virtual resource received by the receiving module 1110. When being executed by the processor 1310, the audio data processing module 1323 may be configured to: process the audio data received by the receiving module 1321, to obtain an audio file data packet. When being executed by the processor 1310, the sending module 1324 may be configured to: upload the audio data packet obtained by the audio data processing module 1323 to the server for audio recognition; and send a virtual resource activation acknowledgment message to the server when the interaction result determined by the interaction result determining module 1325 indicates that the audio data is correct. When being executed by the processor 1310, the interaction result determining module 1325 may be configured to: determine the interaction result according to the first text information and the second text information that are received by the receiving module 1321.

In an embodiment, the instruction modules further include a storage module 1326, when being executed by the processor 1310, the storage module 1326 may be configured to: establish a buffer in storage space, and deposit, by using the buffer, the audio data input by the user; and when being executed by the processor 1310, the audio data processing module 1323 is further configured to: read the audio data from the buffer for transcoding.

In an embodiment, the instruction modules further include a recording module 1326. When being executed by the processor 1310, the recording module 1326 may be configured to: record first duration between when the receiving module 3121 starts to receive the audio input by the user and when the second text information is received. When being executed by the processor 1310, the sending module 1324 may be further configured to: report the first duration recorded by the recording module 1326 to the server, so that the server collects, according to the first duration, statistics on a time consumed by completion of audio recognition once. When being executed by the processor 1310, the recording module 1326 may be configured to: record second duration between when the receiving module 3121 starts to receive the audio input by the user and when the interaction result determining module 1325 determines the interaction result. When being executed by the processor 1310, the sending module 1324 may be further configured to: report the second duration recorded by the recording module 1326 to the server, so that the server collects, according to the second duration, statistics on a time consumed by completion of interaction once. When being executed by the processor 1310, the sending module 1324 may be further configured to: report the interaction result determined by the interaction result determining module 1325 to the server, so that the server collects statistics on the number of times of successful recognition according to the interaction result.

It may be learned from the above that when being executed by the processor 1310, the instruction modules stored in the memory 1320 may implement various functions of the receiving module, the presenting module, the audio data processing module, the sending module, the interaction result determining module, the storage module, and the recording module in the foregoing embodiments.

According to other embodiments of the present application, a plug-in installed in the client includes the receiving module, the audio data processing module, the sending module, and the interaction result determining module in FIG. 11 to FIG. 13. The receiving module is configured to: receive a virtual resource associated with a piece of push information and first text information of the push information from a server; receive audio data input by a user; and receive second text information returned by the server. Further, the audio data processing module is configured to process the audio data received by the receiving module, to obtain an audio file data packet. The sending module is configured to: send the virtual resource and the first text information that are received by the receiving module to a client, so that the client presents the first text information and prompt information, the prompt information prompting the user to input an audio file to obtain the virtual resource; upload the audio data packet obtained by the audio data processing module to the server for audio recognition; send an interaction result determined by the interaction result determining module to the client, so that the client presents the virtual resource received by the receiving module when the interaction result indicates that the audio data is correct; and send a virtual resource activation acknowledgment message to the server when the interaction result determined by the interaction result determining module indicates that the audio data is correct. The interaction result determining module is configured to determine the interaction result according to the first text information and the second text information that are received by the receiving module.

In one embodiment, the plug-in further includes: a storage module, configured to: establish a buffer in storage space, and deposit, by using the buffer, the audio data input by the user; and the audio data processing module is further configured to read the audio data from the buffer for transcoding.

In another embodiment, the plug-in further includes: a recording module, configured to record first duration between when the receiving module starts to receive the audio input by the user and when the second text information is received; and the sending module is further configured to: report the first duration recorded by the recording module to the server, so that the server collects, according to the first duration, statistics on a time consumed by completion of audio recognition once. The recording module is configured to record second duration between when the receiving module starts to receive the audio input by the user and when the interaction result determining module determines the interaction result; and the sending module is further configured to report the second duration recorded by the recording module to the server, so that the server collects, according to the second duration, statistics on a time consumed by completion of interaction once. The sending module is further configured to report the interaction result determined by the interaction result determining module to the server, so that the server collects statistics on the number of times of successful recognition according to the interaction result.

Figure 14:
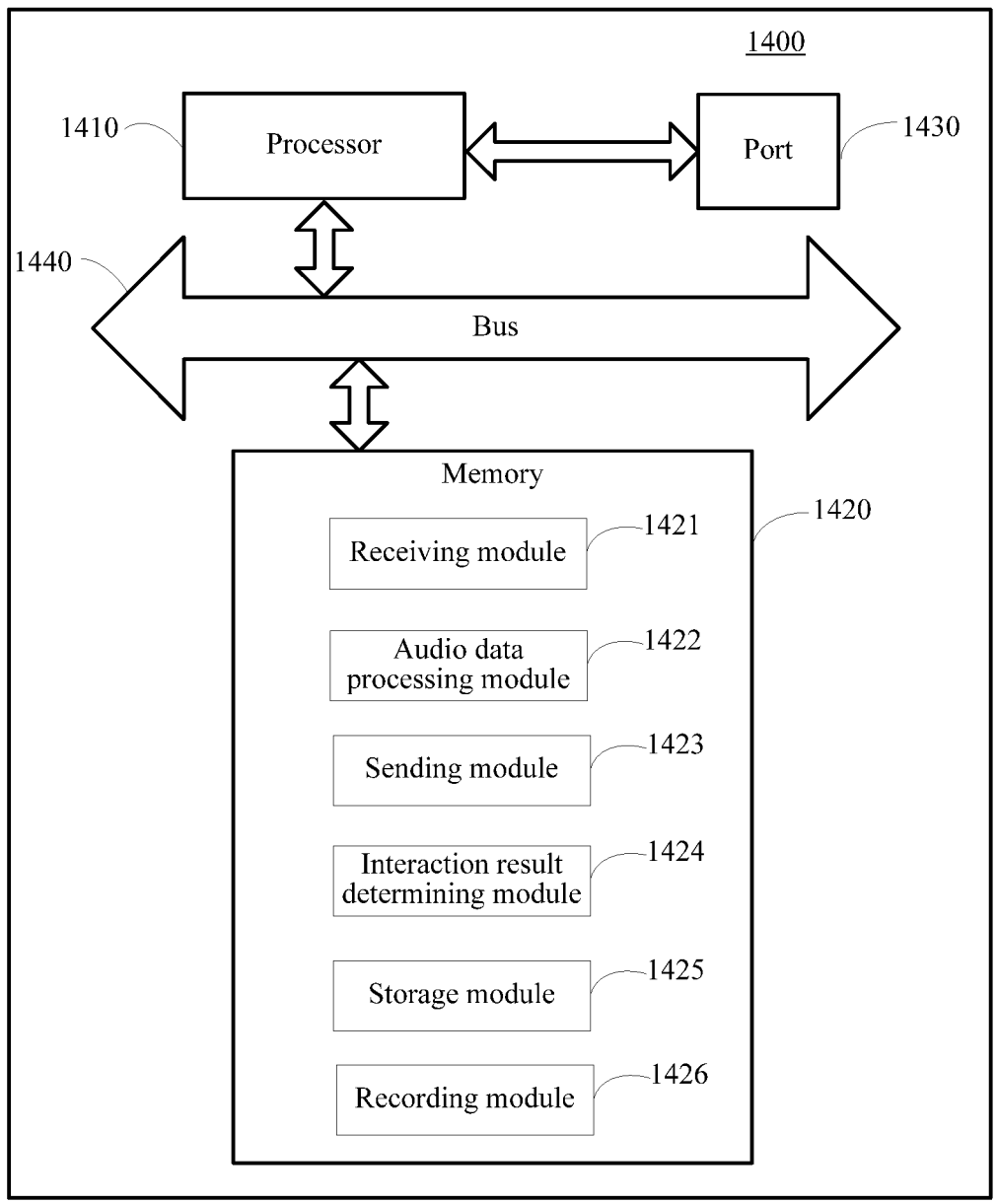
FIG. 14 is a schematic structural diagram of a plug-in according to an embodiment of the present application.

FIG. 14 is a schematic structural diagram of a plug-in according to an embodiment of the present application. The plug-in 1400 may include a processor 1410, a memory 1420, a port 1430, and a bus 1440. The processor 1410 and the memory 1420 are interconnected by using the bus 1440. The processor 1410 may receive and send data by using the port 1430. The processor 1410 is configured to execute machine readable instruction modules stored in the memory 1420. The memory 1420 stores the machine executable instruction modules that can be executed by the processor 1410. The instruction modules that can be executed by the processor 1410 include a receiving module 1421, an audio file data processing module 1422, a sending module 1423, and an interaction result determining module 1424. When being executed by the processor 1410, the receiving module 1421 may be configured to: receive a virtual resource associated with a piece of push information and first text information of the push information from a server; receive audio data input by a user; and receive second text information returned by the server. When being executed by the processor 1410, the audio data processing module 1422 may be configured to process the audio data received by the receiving module 1421, to obtain an audio file data packet.

Further, when being executed by the processor 1410, the sending module 1423 may be configured to: send the virtual resource and the first text information that are received by the receiving module 1421 to a client, so that the client presents the first text information and prompt information, the prompt information prompting the user to input an audio file to obtain the virtual resource; upload the audio data packet obtained by the audio data processing module 1422 to the server for audio recognition; send an interaction result determined by the interaction result determining module 1424 to the client, so that the client presents the virtual resource received by the receiving module when the interaction result indicates that the audio data is correct; and send a virtual resource activation acknowledgment message to the server when the interaction result determined by the interaction result determining module 1424 indicates that the audio data is correct. When being executed by the processor 1410, the interaction result determining module 1424 may be configured to determine the interaction result according to the first text information and the second text information that are received by the receiving module 1421.

In one embodiment, the instruction modules that can be executed by the processor 1410 further include a storage module 1425. When being executed by the processor 1410, the storage module 1425 may be configured to: establish a buffer in storage space, and deposit, by using the buffer, the audio data input by the user; and when being executed by the processor 1410, the audio data processing module 1422 may be configured to read the audio data from the buffer established by the storage module 1425 for transcoding.

In one embodiment, the instruction modules that can be executed by the processor 1410 further include a recording module 1426. When being executed by the processor 1410, the recording module 1426 may be configured to: record first duration between when the receiving module 1421 starts to receive the audio input by the user and when the second text information is received; and when being executed by the processor 1410, the sending module 1423 may be configured to: report the first duration recorded by the recording module 1426 to the server, so that the server collects, according to the first duration, statistics on a time consumed by completion of audio recognition once.

Further, when being executed by the processor 1410, the recording module 1426 may be configured to: record second duration between when the receiving module 1421 starts to receive the audio input by the user and when the interaction result determining module 1424 determines the interaction result; and when being executed by the processor 1410, the sending module 1423 may be configured to: report the second duration recorded by the recording module 1426 to the server, so that the server collects, according to the second duration, statistics on a time consumed by completion of interaction once.

Further, when being executed by the processor 1410, the sending module 1423 may be configured to: report the interaction result determined by the interaction result determining module 1424 to the server, so that the server collects statistics on the number of times of successful recognition according to the interaction result.

It may be learned from the above that when being executed by the processor 1410, the instruction modules stored in the memory 1420 may implement various functions of the receiving module, the audio data processing module, the sending module, the interaction result determining module, the storage module, and the recording module in the foregoing embodiments.

In the foregoing apparatus and system embodiments, specific methods for implementing functions by modules and units are described in all the method embodiments and are not described in detail herein.

It should be noted that, the foregoing function modules or functional units are only divided for exemplary description purposes when the system presents virtual resources based on a user input. In some embodiments, the foregoing function may be allocated to and completed by different function modules according to specific needs, which means that the internal structure of the apparatus may be divided to different functional modules or functional units to complete all or some of the foregoing described functions.

In the present disclosure, a functional module or a functional unit may refer to one or more computer programs stored in one or more computer readable media. When executed by a processor, the computer programs may implement the corresponding functions of the functional module or functional unit. Further, a functional module or a functional unit may include a hardware component and one or more computer programs stored in one or more computer readable media. When executed by a processor, the hardware component and the computer programs may implement the corresponding functions of the functional module or functional unit.

In addition, functional modules in the embodiments of the present application may be integrated into one processing unit, or each of the modules may exist alone physically, or two or more modules may be integrated into one unit. The integrated units may be implemented in a form of hardware or may be implemented in a form of a software functional unit.

In addition, each embodiment of the present application may be implemented by a data processing program that is executed by a data processing device such as a computer. Apparently, the data processing program constitutes the present application. In addition, generally a data processing program stored in a storage medium is executed by directly reading the program from the storage medium or by installing or copying the program to a storage device (such as a hard disk or memory) of a data processing device. Therefore, such a storage medium also constitutes the present application. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MOM).

Therefore, the present application further discloses a storage medium, which stores a data processing program. The data processing program is used for executing any embodiment of the foregoing method of the present application.

The foregoing descriptions are merely preferred embodiments of the present application, but are not intended to limit the present application. Any modification, equivalent replacement, or improvement made within the spirit and principle of the present application shall fall within the protection scope of the present application.

What is claimed is:

1. A method for presenting a virtual resource, applied to a client and comprising:
   receiving, from a server, a piece of push information associated with a virtual resource and a promotion initiator, the push information including first text information;
   presenting, in an interface between the promotion initiator and a user in an instant messaging application, the first text information and prompt information, the prompt information prompting the user to input an audio data input to obtain the virtual resource;
   receiving audio data input by the user, obtaining an audio file data packet;
   uploading the audio data packet to the server for audio recognition;
   receiving second text information returned by the server, and determining an interaction result according to the first text information and the second text information;
   presenting the virtual resource and sending a virtual resource activation acknowledgment message to the server based on the interaction result;
   presenting, in the interface, a forward option of forwarding the push information in response to a user operation on a box containing the first text information;
   displaying, in the interface, a list of friends of the user upon selection of the forward option; and
   sending the prompt information and the first text information to a client of a second user in response to a user operation of selecting the second user from the list, to prompt the second user to input an audio data input to obtain the virtual resource.

2. The method according to claim 1, wherein the obtaining an audio file data packet comprises:
   obtaining a status of a local user equipment;
   determining a transcoding scheme according to at least one of the status or a length of the first text information; and
   transcoding the audio data input by using the transcoding scheme to obtain the audio data packet.

3. The method according to claim 2, further comprising:
   establishing a buffer in storage space;
   when recording the audio data input by the user, depositing the audio data input using the buffer;
   reading buffered audio data from the buffer at each local callback; and
   transcoding the buffered audio data while continuing recording the audio data input by the user.

4. The method according to claim 3, further comprising:
   determining a size of each buffer according to a preset callback time and the transcoding scheme.

5. The method according to claim 4, wherein the size of each buffer equals a product of the preset callback time, a sampling rate in the transcoding scheme, and a number of bytes of encoding each audio sampling value.

6. The method according to claim 2, wherein determining the transcoding scheme comprises:
   selecting a first transcoding algorithm with a first sampling rate when the length of the first text information is less than or equal to a length threshold or when the status of the local user equipment meet a first requirement; and
   selecting a second transcoding algorithm with a second sampling rate when the length of the first text information is less than the length threshold or when the status of the local user equipment does not meet the first requirement, the second sampling rate being less than the first sampling rate.

7. The method according to claim 2, wherein determining the transcoding scheme comprises:
   selecting a sampling rate, a transcoding algorithm, number of bytes in encoding each audio sampling value, and number of channels according to a device capability, a network state, and the length of the first text information.

8. The method according to claim 1, further comprising:
   converting the first text information into a first character string;
   converting the second text information into a second character string;
   determining similarity between the first character string and the second character string; and
   determining the interaction result according to the similarity and a threshold.

9. The method according to claim 8, further comprising:
   converting the first text information into the first character string according to a preset conversion rule table and a preset fuzzy conversion rule table, the fuzzy conversion rule table using an accent feature; and
   the converting the second text information into a second character string comprises:
   converting the second text information into the second character string according to the preset conversion rule table and the preset fuzzy conversion rule table.

10. The method according to claim 8, further comprising:
    calculating, by using a character string similarity algorithm, the minimum number of times of editing needed by conversion from the first character string into the second character string; and
    calculating the similarity between the first character string and the second character string according to the minimum number of times of editing and the length of the longer one of the first character string and the second character string.

11. The method according to claim 1, further comprising:
recording a first duration between when reception of the audio data input by the user starts and when the second text information is received, and reporting the first duration to the server.

12. The method according to claim 1, further comprising:
recording a second duration between when reception of the audio input by the user starts and when the interaction result is determined, and reporting the second duration to the server.

13. The method according to claim 1, further comprising:
reporting the interaction result to the server.

14. A client, comprising a processor and a memory, the memory storing instructions that can be executed by the processor, and when the instructions are executed, the processor being configured to:
receive, from a server, a piece of push information associated with a virtual resource and a promotion initiator, the push information including first text;
present, in an interface between the promotion initiator and a user in an instant messaging application, the first text information and prompt information, the prompt information prompting the user to input an audio file to obtain the virtual resource;
receive audio data input by the user, obtain an audio file data packet;
upload the audio data packet to the server for audio recognition, receive second text information returned by the server, and determine an interaction result according to the first text information and the second text information;
present the virtual resource and send a virtual resource activation message to the server when the interaction result indicates that the audio data is correct;
present, in the interface, a forward option of forwarding the push information in response to a user operation on a box containing the first text information;
display, in the interface, a list of friends of the user upon selection of the forward option; and
send the prompt information and the first text information to a client of a second user in response to a user operation of selecting the second user from the list, to prompt the second user to input an audio data input to obtain the virtual resource.

15. The client according to claim 14, wherein the processor is further configured to: obtain a status of a local user equipment;
determine a transcoding scheme according to at least one of the status or a length of the first text information; and
transcode the audio data by using the transcoding scheme to obtain the audio data packet.

16. The client according to claim 15, wherein the processor is further configured to:
establish a buffer in storage space;
when recording the audio data input by the user, deposit the audio data by using the buffer;
read buffered audio data from the buffer at each local callback; and
transcode the buffered audio data while continuing recording the audio data input by the user.

17. The client according to claim 14, wherein the processor is further configured to: convert the first text information into a first character string;
convert the second text information into a second character string;
determine similarity between the first character string and the second character string; and
determine the interaction result according to the similarity and a threshold.

18. The client according to claim 17, wherein the processor is further configured to: according to a preset conversion rule table and a preset fuzzy conversion rule table, convert the first text information into the first character string and convert the second text information into the second character string, the fuzzy conversion rule table using an accent feature.

19. The client according to claim 17, wherein the processor is further configured to: calculate, by using a character string similarity algorithm, a minimum number of times of editing needed by conversion from the first character string into the second character string; and
calculate the similarity between the first character string and the second character string according to the minimum number of times of editing and the length of the longer one of the first character string and the second character string.

20. A non-transitory computer readable storage medium, storing instructions that can be executed by a processor, and when the instructions are executed, cause the processor to perform:
receiving, from a server, a piece of push information associated with a virtual resource and a promotion initiator, the push information including first text information;
presenting, in an interface between the promotion initiator and a user in an instant messaging application, the first text information and prompt information, the prompt information prompting the user to input an audio data input to obtain the virtual resource;
receiving audio data input by the user, obtaining an audio file data packet;
uploading the audio data packet to the server for audio recognition;
receiving second text information returned by the server, and determining an interaction result according to the first text information and the second text information;
presenting the virtual resource and sending a virtual resource activation acknowledgment message to the server based on the interaction result;
presenting, in the interface, a forward option of forwarding the push information in response to a user operation on a box containing the first text information;
displaying, in the interface, a list of friends of the user upon selection of the forward option; and
sending the prompt information and the first text information to a client of a second user in response to a user operation of selecting the second user from the list, to prompt the second user to input an audio data input to obtain the virtual resource.

* * * * *